J. SAULSBERRY.
CUSHION TIRE.
APPLICATION FILED MAY 14, 1919.

1,393,909.  Patented Oct. 18, 1921.

Inventor
Joseph Saulsberry

By

Attorneys.

UNITED STATES PATENT OFFICE.

JOSEPH SAULSBERRY, OF PEORIA, ILLINOIS.

CUSHION-TIRE.

1,393,909. Specification of Letters Patent. Patented Oct. 18, 1921.

Application filed May 14, 1919. Serial No. 296,978.

*To all whom it may concern:*

Be it known that I, JOSEPH SAULSBERRY, a citizen of the United States, residing at Peoria, in the county of Peoria, State of Illinois, have invented certain new and useful Improvements in Cushion-Tires; and I do hereby declare the following to be a full, clear, and exact description of the invention, such as will enable others skilled in the art to which it appertains to make and use the same.

One object of the present invention is to provide a novel and improved construction of tire employing a series of spherical cushions between which are disposed means for holding the cushions in properly spaced relation from and out of contact with each other during the use of the tire on a wheel.

Another object is to provide a novel and improved spacing member disposed between each pair of the cushions whereby when one of said cushions is removed and another placed in the vacant space the remainder of the cushions will remain in their positions and not crowd toward the vacant space.

Other objects and advantages will be apparent from the following description when taken in connection with the accompanying drawing.

Figure 3:
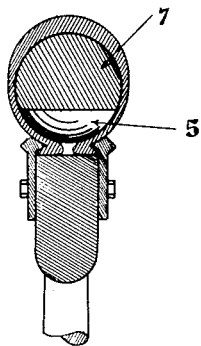
Fig. 3 is a vertical transverse sectional view taken on the line 3—3 of Fig. 1.

Referring particularly to the accompanying drawing, 1 represents a rim of a wheel on which is engaged the clencher tire shoe or casing 6 whose beads 4 may be held by rings 2 bolted at 3 to the rim. Disposed within this casing is an endless series of globular cushions, preferably hollow rubber balls 5, the diameter of each of which is approximately equal to the interior diameter of the tire casing. Between each pair of balls is a spacing member or plug 7 formed from a single piece of rubber and shaped through most of its periphery to fit within the tire casing but cut off on a chord as best seen in Fig. 3 so that its inner side is flat and stands some distance from the rim side of the casing. In the opposite ends of the spacing member, are formed the curved recesses or sockets 8 for the reception of portions of the balls, and a transverse web 9 between the sockets holds the two balls in proper spaced relation to each other and from frictional contact with each other.

Figure 1:
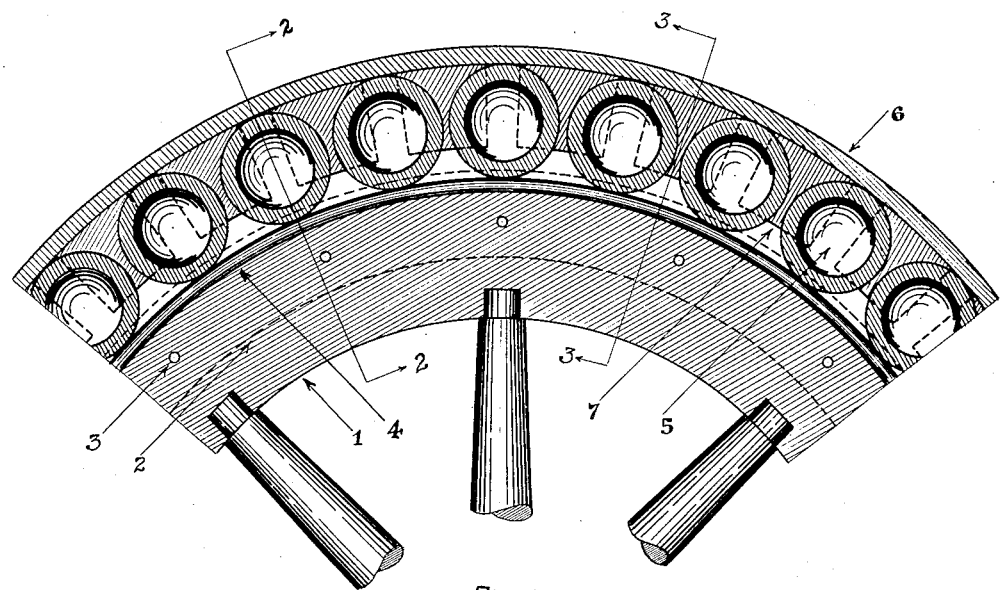
Figure 1 is a vertical longitudinal sectional view through a cushion tire and the rim made in accordance with my invention.
Figure 2:
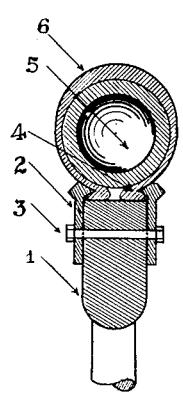
Fig. 2 is a vertical transverse sectional view taken on the line 2—2 of Fig. 1, showing the arrangement of the spacing members.
Figure 4:
Fig. 4 is a perspective view of one of the spacing members removed from the tire.

Attention is invited to the fact that the tread side of the spacer is convex and shaped to fit closely within the corresponding part of the casing, also that the side faces of the spacer conform closely to the normal shape of the side walls of the casing, and as a whole the spacer extends from the tread side inward about two-thirds the distance to the rim side, leaving the remainder of said distance unoccupied as seen in Fig. 3. Bearing this in mind, the sockets 8 are of such length radially of the wheel as to inclose more than half of the spherical cushions 5, while they are of such depth circumferentially of the wheel that each incloses about one-third of the diameter of said cushion, as seen in Fig. 1. Therefore, when the tire is taken off the wheel and its beaded edges spread apart a little, any ball or sphere may be removed by drawing it inward with a force only sufficient to compress the slightly thicker inner edges of the webs 9 of the two contiguous spacers whose sockets hold such balls. These spacers, however, are yet retained in the major outer portion of the casing by reason of their shape and size, and the substitution of a new ball is easy. If it should happen that a spacer becomes defective, two adjacent balls are removed and then the spacer between them can be withdrawn and replaced.

The absence of any part of the spacer between the beaded edges 4 of the casing permits them to be clamped between the rings 2 with ease, because such clamping finds its only resistance in the presence of the convex inner sides of the several balls.

The spacing members also serve to retain the series of balls in their proper position when one of said balls has been removed and a new one is to be inserted. Were the spacers not used, when the old ball was removed, the parts of the series at each side of the space vacated by the old ball would roll toward said space and thus either fill the space entirely or to such an extent as to render it difficult to insert the new ball. With the spacers in position between the balls, the series will be held back so that the old ball can be removed and the new one inserted without difficulty or interference by the remaining balls.

With a tire as thus constructed, when the wheel passes over an obstruction in the roadway and at a point where the obstruction strikes the tread of the casing directly opposite a ball or sphere, the latter will be compressed radially of the wheel in proportion to its possible compressibility and the weight upon it, and it will be correspondingly expanded both circumferentially and transversely of the wheel. The circumferential expansion will be communicated to the rubber spacers next to it and taken up to a certain extent by them and to a slight extent by the next two balls, whereas the transverse expansion will be communicated to the side walls of the casing. Should the obstruction in the roadway strike the casing opposite a spacer, the tread of the casing is borne inward as also is the spacer, and the latter is expanded a little both circumferentially and transversely—this expansion being taken up by the two adjacent balls and communicated to the side walls of the casing as just described with reference to a ball. But while a ball may not move inward bodily because it rests on the rim side of the casing, it is possible if the obstruction is large that a spacing block might be pushed inward a trifle as there is nothing between its flat base and the tread side of the casing. However, such inward movement would only tend to compress the two contiguous balls to a little greater degree, and when the obstruction was passed the spacer would resume its position as seen in Fig. 1.

The fact that the spacer extends inward substantially two-thirds the distance to the rim side of the casing results in the widest portion of its body fitting closely in the widest portion of the casing, while the narrowest portion of its web 9 is between the centers of the next two balls—therefore the spacer cannot readily become displaced whether the tire is on the wheel or not.

What is claimed is:

A tire comprising a shoe having a filling consisting of an annular series of spaced resilient spheres touching the shoe at their outermost peripheral portions, and an annular series of alternating resilient blocks, disposed against the inner surface of the shoe and having their ends provided with spherisectional concavities in which the spheres are fitted, said blocks extending toward the axis of the shoe well beyond the centers of the spheres and holding the spheres from mutual contact, both annular series being concentric with the shoe.

In testimony whereof, I affix my signature in the presence of two witnesses.

JOSEPH SAULSBERRY.

Witnesses:
AUGUSTUS HARRIS,
WM. MCWILLIAMS.